(12) United States Patent
Shelton et al.

(10) Patent No.: US 11,630,675 B2
(45) Date of Patent: Apr. 18, 2023

(54) SERVICE KIOSK DEVICE CONFIGURATION

(71) Applicant: Hewlett-Packard Development Company, L.P., Spring, TX (US)

(72) Inventors: Gerold K. Shelton, Boise, ID (US); Kyle J. Nottingham, Boise, ID (US); Matthew Frederickson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 8 days.

(21) Appl. No.: 16/481,471

(22) PCT Filed: Apr. 30, 2018

(86) PCT No.: PCT/US2018/030294
§ 371 (c)(1),
(2) Date: Jul. 28, 2019

(87) PCT Pub. No.: WO2019/212515
PCT Pub. Date: Nov. 7, 2019

(65) Prior Publication Data
US 2021/0326147 A1    Oct. 21, 2021

(51) Int. Cl.
*G06F 9/44*     (2018.01)
*G06F 9/4401*   (2018.01)
*G06F 21/31*    (2013.01)
*G06Q 20/18*    (2012.01)
*G07C 9/00*     (2020.01)
*G07F 17/12*    (2006.01)

(52) U.S. Cl.
CPC ............ *G06F 9/4411* (2013.01); *G06F 21/31* (2013.01); *G06Q 20/18* (2013.01); *G07C 9/00912* (2013.01); *G07F 17/12* (2013.01)

(58) Field of Classification Search
CPC ....... G06F 9/4411; G06F 21/31; G06Q 20/18; G07C 9/00912; G07F 17/12
See application file for complete search history.

(56) References Cited

U.S. PATENT DOCUMENTS

| | | |
|---|---|---|
| 8,235,247 B2 | 8/2012 | Alvarez |
| 8,587,407 B2 | 11/2013 | Claessen |
| 9,171,415 B2 | 10/2015 | Adams et al. |

(Continued)

FOREIGN PATENT DOCUMENTS

| | | |
|---|---|---|
| CN | 202261387 U | 5/2012 |
| CN | 102549561 A | 7/2012 |

(Continued)

*Primary Examiner* — Zahid Choudhury
(74) *Attorney, Agent, or Firm* — Quarles & Brady LLP

(57) ABSTRACT

Examples associated with service kiosk device configuration are described. One example includes authenticating a user at a service kiosk. The user is authenticated based on a credential provided by the user. A service profile associated with the user is loaded. The service profile describes a device assigned to the user. An operable connection between the service kiosk and the device is established. Service information is obtained from the user via an interface at the service kiosk, from the service profile, and from the device via the operable connection. The service information describes a technical issue associated with the device. The device is configured via the operable connection to resolve the technical issue.

19 Claims, 5 Drawing Sheets

(56) References Cited

U.S. PATENT DOCUMENTS

| | | |
|---|---|---|
| 9,452,884 B2 | 9/2016 | Rutledge et al. |
| 2001/0037207 A1 | 11/2001 | Dejaeger |
| 2008/0211671 A1 | 9/2008 | Daily |
| 2010/0088192 A1 | 4/2010 | Bowles et al. |
| 2010/0314405 A1 | 12/2010 | Alvarez |
| 2011/0060945 A1 | 3/2011 | Leprince et al. |
| 2011/0161227 A1 | 6/2011 | Santo, Jr. |
| 2011/0202798 A1 | 8/2011 | Vera et al. |
| 2012/0079100 A1 | 3/2012 | McIntyre et al. |
| 2012/0254345 A1* | 10/2012 | Montoya ............. G06F 11/2294 709/217 |
| 2013/0103973 A1 | 4/2013 | Werth et al. |
| 2014/0239883 A1* | 8/2014 | Hobson ................ H02J 7/0044 320/137 |
| 2015/0137759 A1* | 5/2015 | Palmer ................. H02J 7/0013 320/112 |
| 2015/0145642 A1 | 5/2015 | Rutledge et al. |
| 2015/0269535 A1 | 9/2015 | Parris |
| 2016/0335616 A1 | 11/2016 | Bordeleau et al. |
| 2016/0364939 A1* | 12/2016 | Chayun ................ H04W 24/04 |
| 2018/0293566 A1* | 10/2018 | Engles .................. G06Q 20/18 |
| 2020/0084040 A1* | 3/2020 | Fish ...................... G06Q 20/18 |
| 2020/0167748 A1* | 5/2020 | Dion ......................... G07F 7/06 |
| 2021/0192484 A1* | 6/2021 | Forutanpour ............ G07F 7/06 |
| 2021/0349982 A1* | 11/2021 | Frederickson ......... G06Q 10/08 |

FOREIGN PATENT DOCUMENTS

| | | |
|---|---|---|
| CN | 103679029 A | 3/2014 |
| KR | 10-0992282 B1 | 11/2010 |
| KR | 10-2017-0061641 A | 6/2017 |
| WO | WO-2008078328 A2 | 7/2008 |
| WO | WO-2009082048 A1 | 7/2009 |

\* cited by examiner

SERVICE KIOSK DEVICE CONFIGURATION

BACKGROUND

Computing devices today have become a fundamental part of the way we live and work, as well as smaller and more mobile. Individuals, for example, use computers and mobile devices for entertainment, communication, shopping, and so forth. Further, businesses often provide computers for their employees so that the employees can efficiently carry out their duties across a wide variety of functions. While some businesses take on ownership and maintenance of devices provided to their users, other companies may opt to offload certain information technology costs using a variety of techniques. For example, some companies may rely on a device-as-a-service (DAAS) offering. A DAAS offering may involve periodic payments to a device provider in exchange for user devices and service guarantees for the hardware, software, and so forth, of the devices.

BRIEF DESCRIPTION OF THE DRAWINGS

The present application may be more fully appreciated in connection with the following detailed description taken in conjunction with the accompanying drawings.

DETAILED DESCRIPTION

Figure 1:
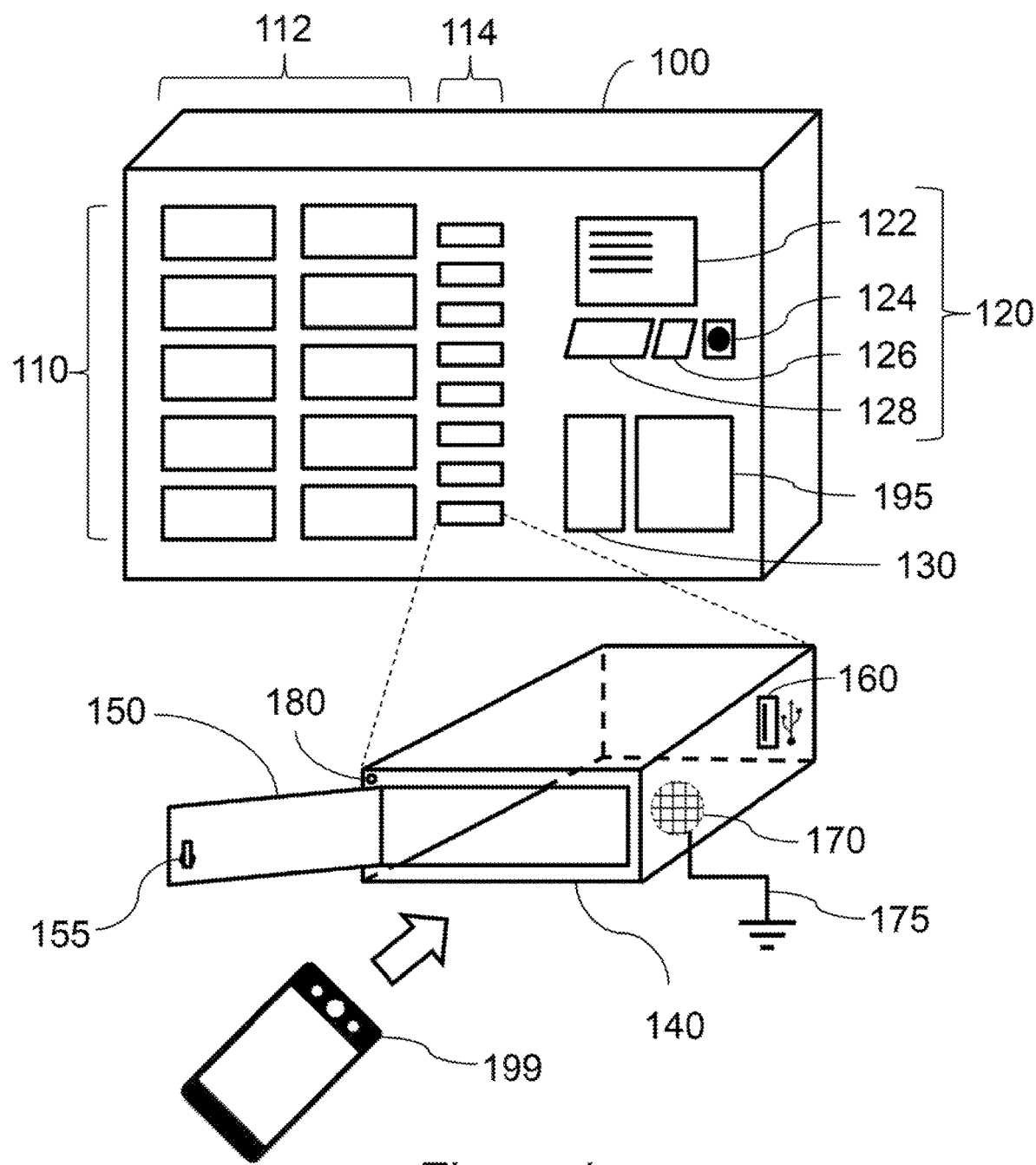
FIG. 1 illustrates an example service kiosk associated with service kiosk device configuration.

Examples associated with service kiosk device configuration are described. As will be more fully described herein, a service kiosk is an apparatus that is meant to store a set of devices for supporting a device-as-a-service model. The service kiosk includes a set of compartments each fitted with connectors to provide a connection between a device stored within the compartment and various control modules embedded in the service kiosk. The service kiosk may be physically installed in a location accessible to employees of a company relying on a device-as-a-service model to provide electronic devices to its employees. When service events associated with devices occur, the employees may visit the kiosk to have their device repaired by the kiosk and/or replaced by backup devices stored in the kiosk. This may increase the uptime of devices assigned to the employees. The backup devices may also reduce support costs associated with sending out technicians to provide support as a device failure can be at least temporarily mitigated by replacing the failed device with a new device in the kiosk, until eventually, a technician can be sent out to efficiently service or replace many devices stored in the kiosk in a single visit.

This disclosure covers a process by which a service kiosk may be used to facilitate diagnosing a technical issue with a device and then resolving the technical issue. A user may bring a device to the service kiosk and connect the device to the service kiosk. The service kiosk may then obtain information from the device, from the user, from external sources, and so forth to facilitate identifying a technical issue with the device. The service kiosk may then resolve the technical issue using the connection, or, if resolution is expected to take longer than a predetermined period of time, provide access to a compartment of the service kiosk in which the device can be stored while the service occurs. The service kiosk may also provide a temporary or permanent replacement device to the user.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

As used herein a service kiosk is intended to broadly describe a category of apparatuses used to securely store electronic devices in a manner that allows the devices to be configured while stored in the service kiosk. The service kiosk may have one or more compartments having data and/or power connectors. Devices that are attached to the data connectors may be configured either directly by the service kiosk or remotely by a remote service. Depending on where the devices are in their life cycle, the configuration may include setting up a device for a new user, modifying the device on behalf of a current user (e.g., reconfiguring the device, repairing the device), deprovisioning a device, and so forth. The service kiosk may also include an interface for communicating with and/or authenticating users. Once authenticated, the service kiosk may grant the user access to devices and or compartments to allow the user to perform a task related to a device assigned to the user. The task may involve obtaining a device from the kiosk, storing a device in the kiosk, and so forth. In various examples, the service kiosk may resemble, for example, a vending machine, a set of lockers, a chest of drawers, and so forth. Various structural components of a service kiosk may be made from wood, metal, plastic, or other suitable materials. The service kiosk may include structural elements such as legs, supports, wall fasteners, and so forth.

Consequently, the service kiosk may facilitate fulfilling service guarantees of a device-as-a-service (DAAS) offering. In a DAAS offering, a user or business may periodically pay a device provider for a device and a promise to service the device in the event the device fails. The service guarantee may include a variety of terms and in various examples may cover firmware, software, hardware, device data, user data, periodic lifecycle upgrades, and so forth. In this example, ownership of the device may remain with the device provider. In the event of a failure of the device or some other technical issue related to the device, a service kiosk stationed in a location accessible to the user may allow the device provider to more easily provide technical support for the device, up to and including replacing the device with a working device. For businesses that are relying on several devices at any given time, it may be cost effective for the business to have an on-site service kiosk to be able to quickly provision a new device for a new user, deprovision a device when that device's user leaves the business, and so forth, in addition to the technical support features that may be facilitated by the service kiosk itself. Eventually, when it is determined that the state of the devices in the service kiosk make it likely the service kiosk will begin failing to fulfil the service guarantee to the business (e.g., because the service kiosk is full, empty, has a number of devices in need of repair, or a combination of factors) a technician may be called to service the kiosk and/or devices stored within. This may be less expensive to the business and/or the device provider than having a technician on site, or having a technician called to service each malfunctioning device.

FIG. 1 illustrates an example service kiosk 100 associated with receptacle isolation. Service kiosk 100 includes a set of receptacles 110. While 18 receptacles are shown, in other examples, service kiosk 100 may include a greater or lesser number of receptacles. The receptacles 110 may be adapted for storing electronic devices 199. Different receptacles may be adapted to store different types of electronic devices 199. Here for example, receptacles 112 may be adapted to store a first type of device (e.g., laptops), and receptacles 114 may be adapted to store a second type of device (e.g., cell phones). In other examples, receptacles may be configured to store different types, models, and/or brands of laptops, phones, tablets, or other device types. Receptacles 110 may be adapted to store different types of devices based on a variety of attributes. For example, receptacles 110 for storing phones may be smaller than receptacles 110 for storing laptops.

One receptacle 140 is illustrated in additional detail to further illustrate features of receptacles 110. In this example, receptacle 140 is adapted for storing cellular phones 199. This may affect the size of receptacle 140, connectors 160 installed in receptacle 140, and so forth. Here, receptacle 140 is shown as having a universal serial bus (USB) connector 160. USB connector 160 may provide power to device 199 as well a data connection between device 199 and other components of service kiosk 100. For laptops, receptacles 110 may use a different configuration of connectors 160 for providing power and/or data to a device 199. For example, a regional power adaptor may be used for providing power to devices. The data connection for a laptop may be provided using, for example, an ethernet port, a universal serial bus port, or other types of ports.

It is also worth observing that in other examples, connector 160 may take different physical forms. Here, connector 160 is illustrated as a USB port in the rear wall of receptacle 140. This may mean that to connect device 199 to connector 160, an appropriate cable would also need to be provided. In other examples, connectors 160 may be cables or retractable cables of the appropriate type for connecting to a device type for which receptacle 140 is configured, a docking port of the appropriate type for connecting to a device type for which receptacle 140 is configured, a wireless communication transmitter (e.g., WIFI, Bluetooth) and so forth. The different connector types may have different tradeoffs. For example, a USB port as illustrated may ensure that a device appropriate cable is provided to a user who obtains a device from receptacle 140, but would also mean that a user inserting a device 199 would have to bring or be provided such a cable. Alternatively, a connector that involves an installed cable or docking port may ensure that a person inserting a device into receptacle 140 would be able to insert the device without providing an additional cable, but would mean that a user retrieving a device from receptacle 140 would have to be provided an appropriate cable through an alternative method.

Receptacle 140 also includes a locking mechanism 155. In this example, locking mechanism 155 is illustrated as being attached to a door 150 of receptacle 140. However, locking mechanism 155 may take a variety of forms and its form may depend on the form by which door 150 is designed to give access to users. Here for example, door 150 is illustrated as opening outwards, though in other examples, a sliding, rotating, or retracting door may be appropriate. Locking mechanism 155 may be controllable by other components of service kiosk 100 to grant and restrict access to receptacle 140. These other components and the situations in which access to receptacle 140 may be controlled are more fully discussed below. In some examples, it may also be desirable for locking mechanism 155 to be controllable via a physical mechanism (e.g., a service key). This may allow receptacle 140 to be serviced by a technician to, for example, modify the contents of receptacle 140, repair a component of receptacle 140, and so forth, even when service kiosk 100 is unpowered.

In this example, receptacle 140 is illustrated as incorporating a digital isolator 170. Here, digital isolator 170 is illustrated as a faraday cage 170 that is built into the structure of receptacle 140. Faraday cage 170 may prevent wireless electronic signals from being transmitted by device 199 to devices external to receptacle 140, as well as preventing device 199 from receiving wireless signals from devices external to receptacle 140. In this example, faraday cage 140 is illustrated as being grounded 175, though in other examples, the ground may be excluded. Other digital isolation techniques may also be employed. For example, digital isolation may also be achieved via the port 160 providing a data connection between device 199 and other components of service kiosk 100. By way of illustration service kiosk 100 may implement individualized networks to prevent direct transmission of wired signals between devices in members of the set of receptacles 110. This may also prevent devices 199 from detecting whether other devices are connected to service kiosk 100. Digital isolation may also include signal isolation to ensure secure communication between devices in the receptacles 110 and other components of service kiosk 100. In some examples, digital isolation may also incorporate power isolation.

Service kiosk 100 also includes an interface 120. Interface 120 may include several components. Here interface 120 includes a display 122, a keyboard 128, a keypad 126, and a radio frequency identification (RFID) scanner 124. Interface 120 may use these components to facilitate communicating with user interacting with service kiosk 100. Interface 120 may also include additional components including for example, cameras, touch input devices, external device connectors (e.g., to provide power and/or data to devices not in receptacles 110), and so forth. Interface 120 may also make use of lights 180 associated with individual receptacles 110. These lights 180 may allow the interface to direct a user to a specific receptacle 110 of service kiosk 100. For example, when service kiosk 100 seeks to direct a user to a specific receptacle 110, service kiosk 100 may control a light on that receptacle to turn on, blink, and so forth.

Service kiosk 100 may also include a variety of modules 130 for performing various functions associated with service kiosk 100 and/or configuring devices 199 stored in compartments 110 of service kiosk 100. Modules 130 may be, for example, performed by a processor of a computer embedded in service kiosk 130. In other examples, modules 130 may act as a communication pass through for communications between a remote information technology module (e.g., a device-as-a-service operation) and devices 199 stored in compartments 110 of service kiosk 100.

In various examples, the modules 130 may interact with a user via interface 120, with devices 199 in compartments 110, with other modules 130, and with remote servers and/or devices. For example, modules 130 may include an authentication module. The authentication module may receive a credential from a user and authenticate the credential based on authentication data associated with the user. The authentication data may have been received from a remote information technology module. When the user is successfully authenticated, the authentication module or another module 130 of service kiosk 100 may grant the user access to one or more receptacles 110 of service kiosk 100. The user may provide the credential via user interface 120. The credential may be, for example, a username and password pair that identifies the user that the user inputs via keyboard 128. In another example, the credential may be an RFID signal the user provides via RFID scanner 124. In another example, the user may authenticate themselves by attaching the mobile device 199 to a data connector of service kiosk 100. Multifactor authentication may also be appropriate involving a combination of the above and/or other authentication techniques.

In various examples, service kiosk 100 may be selective about granting user access to receptacles 110. How service kiosk 100 determines which receptacles 110 to which a user is granted access may depend on what function service kiosk 100 is performing for the user. In various examples, the user may be picking up a device from service kiosk 100, storing a device in service kiosk 100, having a device repaired or configured by service kiosk 100, diagnosing a technical issue with a device with the help of service kiosk 100, and so forth. In these examples, service kiosk 100 may grant such a user access only to receptacles associated with the task being performed by service kiosk 100. The user may be granted access to these receptacles 110 by service kiosk 100 controlling locking mechanisms 155 on the respective receptacles 110. In cases where the user is a technician responsible for servicing service kiosk 100, the user may be granted access to specific receptacles, or in some cases general access to all receptacles 110. This may allow the technician to adjust the contents of the receptacles and/or perform physical maintenance on devices stored within service kiosk 100 or on service kiosk 100 itself.

Service kiosk 100 may also include a variety of other components 195. For example, component 195 may be a compartment storing additional supplies that support the purpose of service kiosk 100. By way of illustration, component 195 may store spare parts, extra data and/or power cables, and so forth that may be used by users interacting with service kiosk 100. In other examples, component 195 may also store, for example, packaging and mailing supplies for shipping devices 199 for service. Other potential components 195 may also be contemplated.

Figure 2:
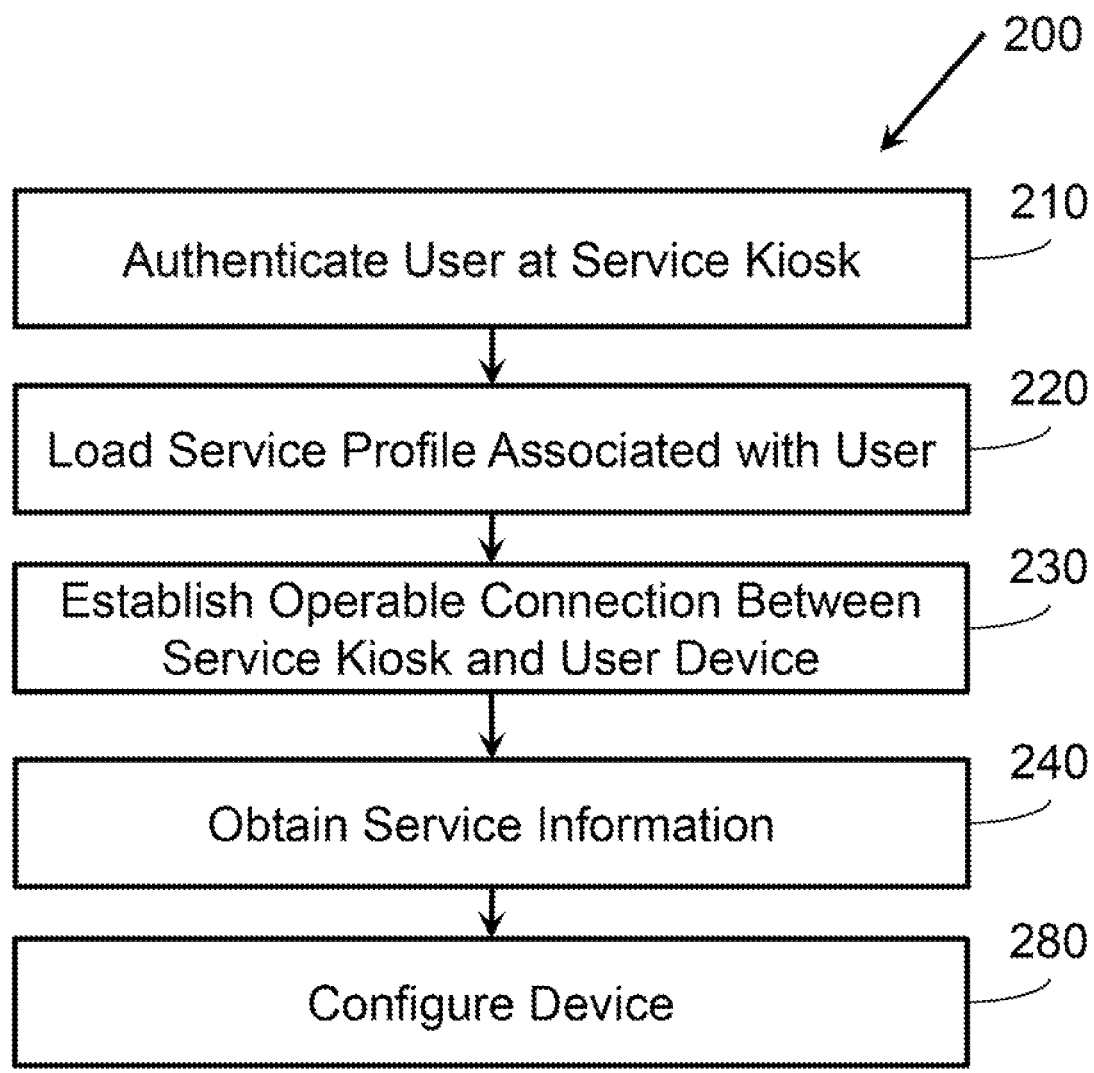
FIG. 2 illustrates a flowchart of example operations associated with service kiosk device configuration.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with service kiosk device configuration. Method 200 includes authenticating a user at a service kiosk at 210. The user may be authenticated based on a credential provided by the user. In some examples the user may be authenticated based on authentication data associated with the user stored in the service kiosk. In other examples, the service kiosk may transmit the credential provided by the user to a remote device over a secure connection. The remote device (e.g., a server) may then authenticate the user and then transmit a signal to the service kiosk controlling the service kiosk to provide the user access to features of the service kiosk. The credential may be, for example, a password, a biometric, a signal received from an object in possession of the user (e.g., a radio frequency identifier), a multifactor credential, and so forth. Thus, the service kiosk may include components that facilitate receipt of the credential including, for example, a keyboard, a keypad, a radio frequency identification scanner, a biometric scanner, and so forth.

Method 200 also includes loading a service profile associated with the user at 220. The service profile may describe a device assigned to the user. The service profile may be retrieved from a remote server that manages a device-as-a-service infrastructure for a company that employs the user. The service profile may describe, for example, previous technical issues associated with the user, previous technical issues associated with the device assigned to the user, components of the device, and so forth.

Method 200 also includes establishing an operable connection between the service kiosk and the device at 230. This may be achieved when the user connects the device to the service kiosk via an operable connection (e.g., a wired connection such as a USB or Ethernet connection). In other examples the connection may occur automatically via, for example, a wireless protocol (e.g., wireless, Bluetooth, near field communication.

Method 200 also includes obtaining service information at 240. The service information may be obtained from the user via an interface at the service kiosk, from the service profile, from the device via the operable connection, and so forth. The service information may describe a technical issue associated with the device. Service information may be obtained using an iterative, triage style process where queries are posed to the user, the device, and so forth by the service kiosk to identify the technical issue that the user would like to resolve.

Method 200 also includes configuring the device at 280. The device may be configured via the operable connection to resolve the technical issue. In various examples, the technical issue may relate to one or more of, configuring a setting of the device, installing an application on the device, removing malicious data from the device, restoring the device to a prior valid state, updating an application on the device, and so forth.

Figure 3:
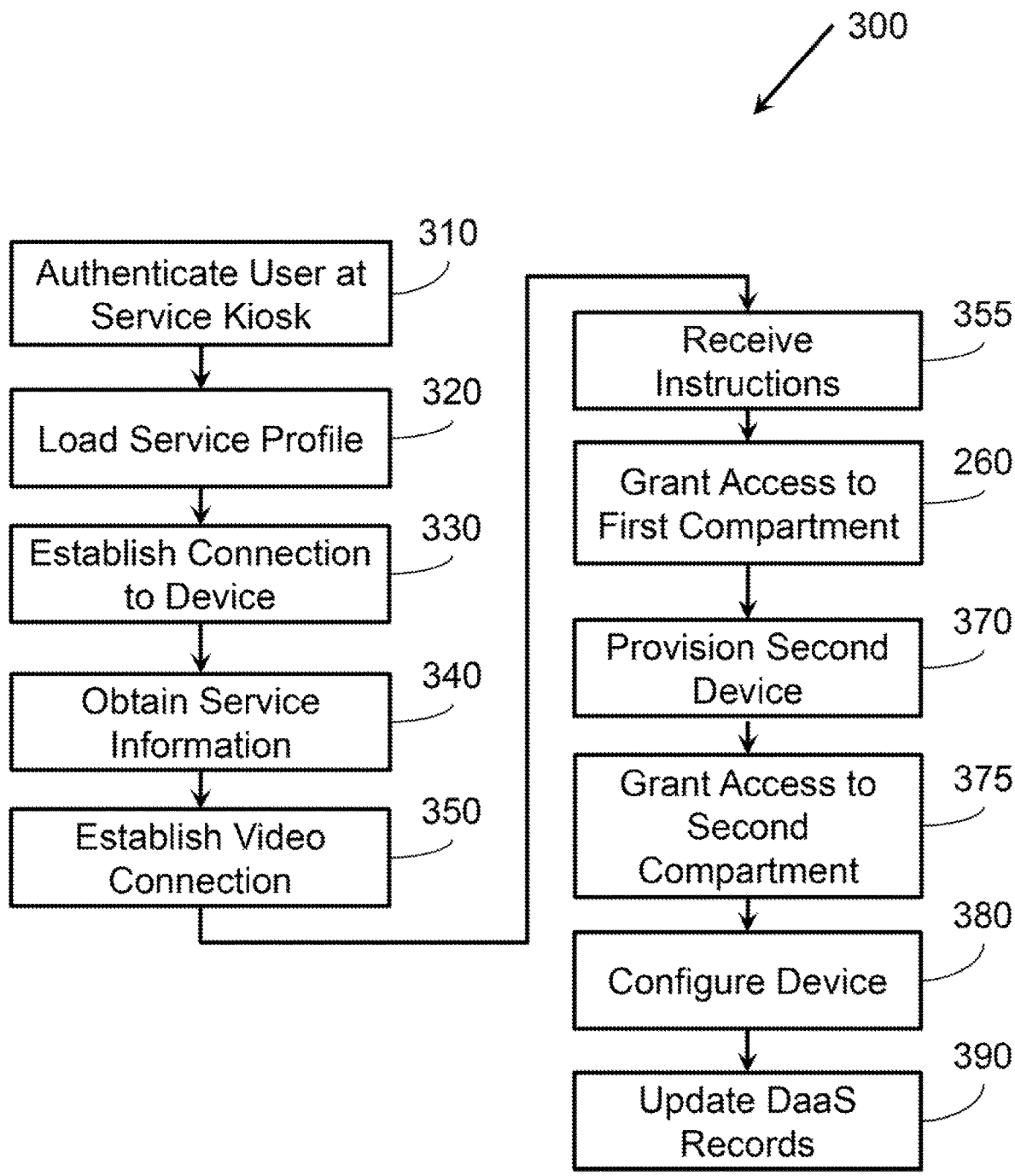
FIG. 3 illustrates another flowchart of example operations associated with service kiosk device configuration.

FIG. 3 illustrates a method 300 associated with service kiosk device configuration. Method 300 includes several actions similar to those described above with reference to method 200 (FIG. 2). For example, method 300 includes authenticating a user at a service kiosk at 310, loading a service profile at 320, establishing a connection to a device at 330, obtaining service information at 340, and configuring the device at 380.

Method 300 also includes establishing a video connection between a remote technician and an interface of the service kiosk at 350. This may allow the technician to assist in diagnosing the technical issue associated with the device. When the technician identifies the technical issue, method 300 also includes receiving instructions from the remote technician at 355. The instructions may describe how to configure the device to resolve the technical issue.

In some instances, configuring the device may take a period of time that exceeds a predefined threshold (e.g., based on a service guarantee). Thus, method 300 includes granting access to a first compartment of the service kiosk at 360. This may allow the user to leave the device in the first compartment of the service kiosk. The first compartment may include a power source to provide power to the device and a data connection to provide an operable connection between the device and the service kiosk.

To ensure the user has access to a device while their device is being configured by the service kiosk, method 300 also includes provisioning a second device at 370. The second device may be stored in a second compartment of the service kiosk. The user may then be granted access to the second compartment at 375. This may allow the user to, for example, continue working while the device is being configured.

Method 300 also includes updating records in a device-as-a-service (DaaS) database. The records may be updated to reflect the possession status of the user regarding the device and the second device.

Figure 4:
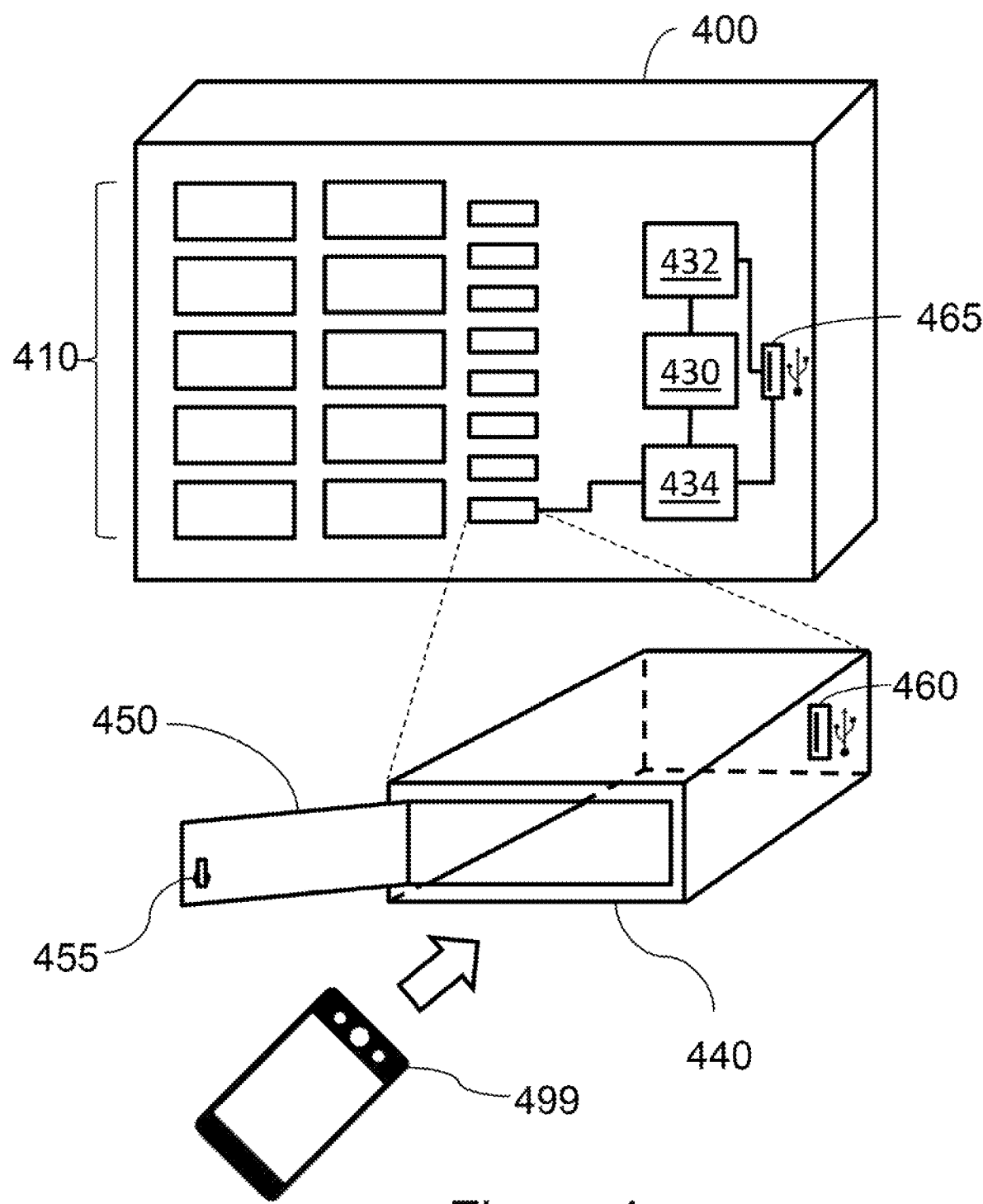
FIG. 4 illustrates another example service kiosk associated with service kiosk device configuration.

FIG. 4 illustrates an example service kiosk 400 associated with service kiosk provisioning. Service kiosk 400 includes a set of receptacles 410. An example receptacle 440 is illustrated in additional detail. Each member of the set of receptacles 410 may include an internal adaptor 460. Internal adaptor 460 may provide power to an electronic device 499, a data connection between electronic device 499 and components of service kiosk 400, and so forth. Members of the set of receptacles 410 may also include a locking mechanism 455 to secure the contents of the receptacles 410 (e.g., electronic device 499). In this example, locking mechanism 455 is attached to a door 450 of example receptacle 440. Here the locking mechanism may be able to rotate in a manner that prevents door 455 from opening.

Service kiosk 400 also includes an authentication module 430. Authentication module 430 may authenticate a user based on a credential provided by the user. As discussed above, the authentication module 430 may authenticate the user based on data stored in service kiosk 400, by transmitting the credential to a remote device, and so forth. Further, the credential may be provided by the user via a user interface of service kiosk 400 (not shown). The credential may be, for example, a password, a biometric, a signal from a device in possession of the user, and so forth. Accordingly, the user interface of service kiosk 400 may include corresponding technology for receiving or otherwise detecting or obtaining the credential.

Service kiosk 400 also includes an external adaptor 465. External adaptor 460 may provide an operable connection between a user device (e.g., device 499) and service kiosk 400. Here, external adaptor 465 is illustrated as a USB port. In other examples, external adaptor 465 may be an ethernet connection, or another type of connector that depends on the type(s) of devices service kiosk 400 is configured to support.

Service kiosk 400 also includes a triage module 432. Triage module 432 may obtain service information from the user, from user device 499, from a service profile associated with user device 499, and so forth. The service information may describe a technical issue associated with user device 499. By way of illustration, the service information may be built based on a series of queries according to a triage model that facilitates identifying the technical issue. In some examples, the service profile may be retrieved from a remote server. The remote server may manage a device-as-a-service environment for an employer of the user.

Service kiosk 400 also includes a repair module 434. Repair module 434 may configure user device 499 via external adaptor 465, an internal adaptor of a selected receptacle (e.g., internal adaptor 460 of receptacle 440), and so forth. In cases where repair module 434 is to configure user device 499 via internal adaptor 460, authentication module 430 may facilitate controlling access to receptacle 440 via locking mechanism 455. For example, authentication module 430 may control locking mechanism 455 to provide access to the user to insert user device 499 into receptacle 440 and connect user device 499 to internal adaptor 460. Additionally, authentication module 430 may further control locking mechanism 455 to provide access to receptacle 440 after authenticating the user based on the user credential once repair module 434 has completed configuration of user device 499.

Additionally, where user device 499 is to be left in a receptacle 410 of service kiosk 400, it may be desirable to provide the user with a temporary or permanent replacement device. Consequently, service kiosk 400 may include a provisioning module (not shown). The provisioning module may provision a second device for the user. The second device may be stored in a second receptacle 410 of service kiosk 400. The provisioning module or the authentication module may also grant the user physical access to the second receptacle of service kiosk 400. This may allow the user to retrieve the backup or replacement device.

Figure 5:
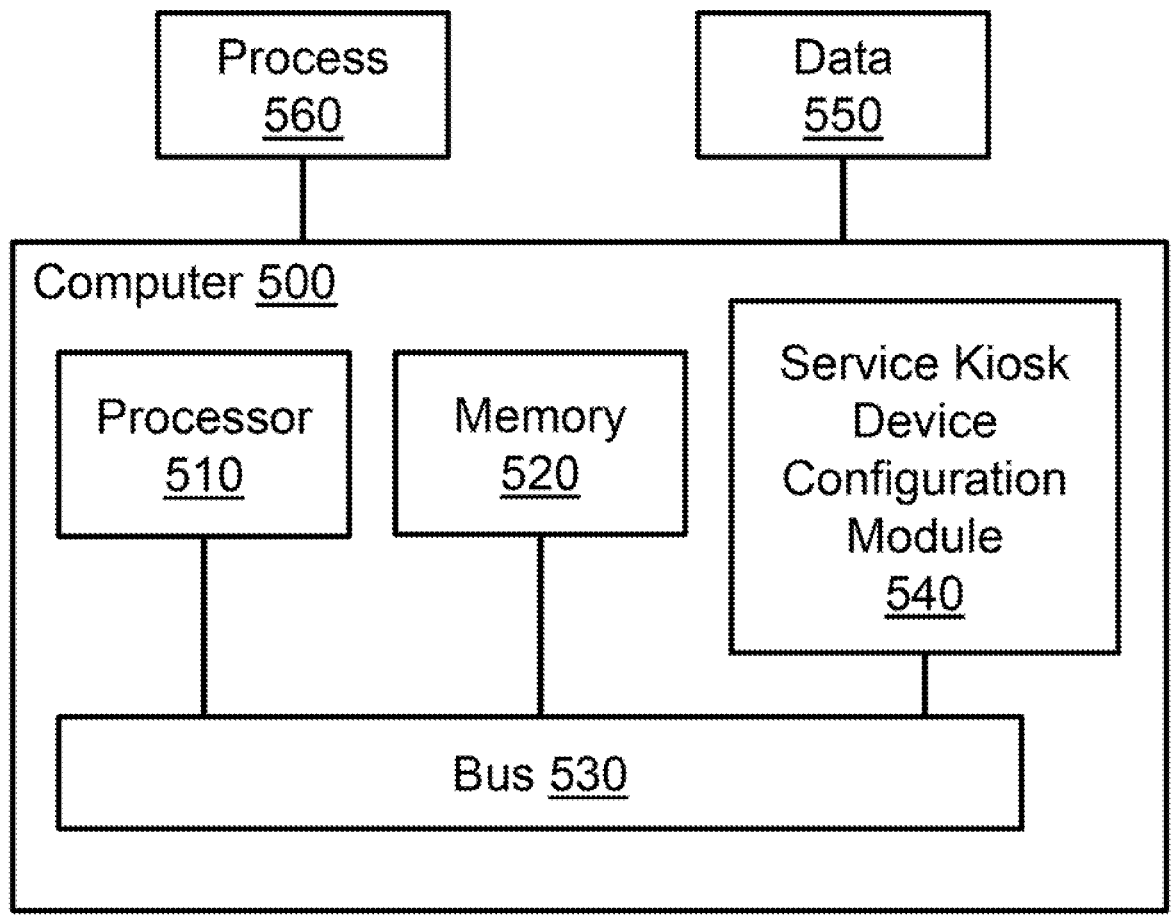
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes a service kiosk device configuration module 540. Service kiosk device configuration module 540 may perform, alone or in combination, various functions described above with reference to the example systems, methods, and so forth. In different examples, service kiosk device configuration module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory, flash memory, memristor) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
authenticating, at a service kiosk comprising a plurality of compartments for holding respective devices, a user based on a credential provided by the user;
loading a service profile associated with the user, the service profile describing a first device assigned to the user;
obtaining, via an interface of the service kiosk, service information describing a technical issue associated with the first device;
determining, by the service kiosk, that a resolution of the technical issue is expected to take longer than a predetermined time period;
in response to determining that the resolution of the technical issue is expected to take longer than the predetermined time period, granting the user access to a first compartment of the plurality of compartments in which to place the first device;
while the first device is in the first compartment, establishing a data connection between the service kiosk and the first device, and powering the first device using a power source in the first compartment; and
configuring the first device over the data connection while the first device is in the first compartment to resolve the technical issue.

2. The method of claim 1, comprising
provisioning, for the user, a second device stored in a second compartment of the service kiosk; and
granting the user physical access to the second compartment of the service kiosk to allow the user to retrieve the second device.

3. The method of claim 1, comprising establishing a video connection between a remote technician and the interface of the service kiosk to allow the technician to assist in diagnosing the technical issue associated with the first device.

4. The method of claim 3, comprising receiving instructions from the remote technician for configuring the first device to resolve the technical issue.

5. The method of claim 1, where the technical issue relates to one or more of: configuring a setting of the first device, installing an application on the first device, removing malicious data from the first device, restoring the first device to a prior valid state, and updating an application on the first device.

6. A service kiosk comprising:
a plurality of compartments to hold electronic devices;
a processor; and
a non-transitory storage medium storing instructions executable on the processor to:
authenticate a user based on a credential provided by the user;
receive service information describing a technical issue associated with a first electronic device of the user;
determine that a resolution of the technical issue is expected to take longer than a predetermined time period;
in response to determining that the resolution of the technical issue is expected to take longer than the predetermined time period, grant the user access to a first compartment of the plurality of compartments;
while the first electronic device is in the first compartment, establish a data connection between the service kiosk and the first electronic device, and provide power to the first electronic device using a power source in the first compartment; and
configure the first electronic device over the data connection while the first electronic device is in the first compartment to resolve the technical issue.

7. The service kiosk of claim 6, wherein the instructions are executable on the processor to receive the service information from a remote server that manages a device-as-a-service environment for the user.

8. The service kiosk of claim 6, wherein the first compartment has a connector to establish the data connection between the service kiosk and the first electronic device.

9. The service kiosk of claim 6, wherein the configuring of the first electronic device comprises modifying a state of the first electronic device over the data connection while the first electronic device is in the first compartment of the service kiosk.

10. The service kiosk of claim 6, wherein the instructions are executable on the processor to provision, for the user, a second electronic device stored in a second compartment of the service kiosk and to grant the user physical access to the second compartment of the service kiosk to provide the user a backup electronic device from the second compartment while the first electronic device is configured in the first compartment to address the technical issue.

11. A non-transitory computer-readable medium comprising instructions that when executed cause a service kiosk to:
authenticate, at the service kiosk, a user based on a credential provided by the user;
obtain a service profile associated with the user, the service profile describing a device assigned to the user;
receive service information describing a technical issue associated with the device;
determine that a resolution of the technical issue is expected to take longer than a predetermined time period;
in response to determining that the resolution of the technical issue is expected to take longer than the predetermined time period, grant the user access to a first compartment of a plurality of compartments of the service kiosk in which to place the device;
while the device is in the first compartment, establish a data connection between the service kiosk and the device, and provide power to the device using a power source in the first compartment; and
configure the device over the data connection while the device is in the first compartment to resolve the technical issue.

12. The non-transitory computer-readable medium of claim 11, wherein the establishing of the data connection comprises establishing a wired connection while the device is in the first compartment of the service kiosk, and wherein the configuring of the device comprises configuring the device over the wired connection while the device is in the first compartment of the service kiosk.

13. The non-transitory computer-readable medium of claim 11, wherein the configuring of the device comprises modifying a state of the device over the data connection while the device is in the first compartment of the service kiosk, and wherein the modifying of the state of the device comprises one or more of: installing a new program on the device over the data connection while the device is in the first compartment of the service kiosk, updating a program in the device over the data connection while the device is in the first compartment of the service kiosk, removing malicious data from the device over the data connection while the device is in the first compartment of the service kiosk, or restoring the device to a prior state over the data connection while the device is in the first compartment of the service kiosk.

14. The non-transitory computer-readable medium of claim 11, wherein the instructions when executed cause the service kiosk to update records in a device-as-a-service database to reflect a possession status of the user regarding the device.

15. The method of claim 1, wherein the establishing of the data connection comprises establishing a wired connection while the first device is in the first compartment of the service kiosk.

16. The method of claim 15, wherein the configuring of the first device comprises configuring the first device over the wired connection while the first device is in the first compartment of the service kiosk.

17. The method of claim 1, wherein the configuring of the first device comprises modifying a state of the first device over the data connection while the first device is in the first compartment of the service kiosk.

18. The method of claim 17, wherein the modifying of the state of the first device comprises one or more of: installing a new program on the first device over the data connection while the first device is in the first compartment of the service kiosk, updating a program in the first device over the data connection while the first device is in the first compartment of the service kiosk, removing malicious data from the first device over the data connection while the first device is in the first compartment of the service kiosk, or restoring the first device to a prior state over the data connection while the first device is in the first compartment of the service kiosk.

19. The service kiosk of claim 9, wherein the modifying of the state of the first electronic device comprises one or more of: installing a new program on the first electronic device over the data connection while the first electronic device is in the first compartment of the service kiosk, updating a program in the first electronic device over the data connection while the first electronic device is in the first compartment of the service kiosk, removing malicious data from the first electronic device over the data connection while the first electronic device is in the first compartment of the service kiosk, or restoring the first electronic device to a prior state over the data connection while the first electronic device is in the first compartment of the service kiosk.

* * * * *